(12) United States Patent
Gerhards et al.

(10) Patent No.: US 10,279,957 B2
(45) Date of Patent: May 7, 2019

(54) CONTAINER FOR LIQUID DETERGENT AND METHOD FOR THE METERED DISPENSING OF DETERGENT FROM THE CONTAINER

(71) Applicant: Henkel AG & Co. KGaA, Duesseldorf (DE)

(72) Inventors: Katja Gerhards, Duesseldorf (DE); Gerhard Josef Theumert, Duesseldorf (DE); Asimina Gkortza, Duesseldorf (DE); Rainer Geberzahn, Juechen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 147 days.

(21) Appl. No.: 15/323,257

(22) PCT Filed: Jun. 16, 2015

(86) PCT No.: PCT/EP2015/063459
§ 371 (c)(1),
(2) Date: Dec. 30, 2016

(87) PCT Pub. No.: WO2016/000953
PCT Pub. Date: Jan. 7, 2016

(65) Prior Publication Data
US 2018/0170617 A1    Jun. 21, 2018

(30) Foreign Application Priority Data

Jun. 30, 2014   (DE) .................. 10 2014 212 601

(51) Int. Cl.
*B65D 23/10*     (2006.01)
*B65D 1/02*      (2006.01)
(Continued)

(52) U.S. Cl.
CPC .......... *B65D 23/102* (2013.01); *B65D 1/0261* (2013.01); *B65D 1/20* (2013.01);
(Continued)

(58) Field of Classification Search
CPC ....... G01F 13/00; B65D 23/10; B65D 23/102; B65D 21/0223; B65D 2501/0081;
(Continued)

(56) References Cited

U.S. PATENT DOCUMENTS 1,659,383 A    2/1928   Hermann et al.
3,054,535 A  * 9/1962   Clarey ................. B65D 1/0223
                                                       215/372
(Continued)

FOREIGN PATENT DOCUMENTS

DE         69405860 T2     4/1998
DE         29705992 U1     7/1998
(Continued)

*Primary Examiner* — Paul R Durand
*Assistant Examiner* — Andrew P Bainbridge
(74) *Attorney, Agent, or Firm* — Fabian VanCott; Steven L. Nichols

(57) ABSTRACT

A container for liquid washing agent, including: a main container body for receiving the washing agent; an opening for dispensing the washing agent; a first standing base that is arranged opposite the opening and defines a filling position of the container; a second standing base that is arranged beside the first standing base and defines a storage position of the container; a grip region that extends towards the opening from a side of the first standing base remote from the second standing base; and a rolling surface that is arranged opposite the grip region and extends substantially from the second standing base as far as the opening, wherein the grip region comprises a portion which is arranged above the second standing base when the container is standing on the second standing base in the storage position.

17 Claims, 4 Drawing Sheets

(51) Int. Cl.
    *B65D 1/20*         (2006.01)
    *B65D 83/00*       (2006.01)
    *B65D 1/44*         (2006.01)
    *G01F 13/00*       (2006.01)
    *B65D 6/00*         (2006.01)
    *B65D 21/02*       (2006.01)

(52) U.S. Cl.
    CPC ............... *B65D 1/44* (2013.01); *B65D 83/00* (2013.01); *G01F 13/00* (2013.01); *B65D 11/20* (2013.01); *B65D 21/0223* (2013.01); *B65D 23/10* (2013.01); *B65D 2501/0081* (2013.01)

(58) Field of Classification Search
    CPC .... B65D 83/00; B65D 1/0261; B65D 1/0276; B65D 1/0284; B65D 1/20; B65D 1/44; B65D 11/20
    USPC ........... 222/23, 41, 156–159, 463, 164, 166, 222/454–457, 323–324; 215/370–372, 215/382; 220/604, 608, 610, 623, 628, 220/631
    See application file for complete search history.

(56) References Cited

U.S. PATENT DOCUMENTS

| | | | | |
|---|---|---|---|---|
| 4,293,084 | A * | 10/1981 | Lussier | G01F 19/00 116/227 |
| 5,423,452 | A * | 6/1995 | Tardif | A47J 43/0727 220/574 |
| 6,082,591 | A * | 7/2000 | Healey | B65D 1/023 222/158 |
| 6,244,471 | B1 * | 6/2001 | Nonnenmacher | G01F 11/28 222/158 |
| 6,945,434 | B1 * | 9/2005 | Dionne | B65D 23/001 222/186 |
| 9,845,171 | B2 * | 12/2017 | Conway | B65D 25/2882 |
| 2003/0068410 | A1 | 4/2003 | Pezzoli | |
| 2004/0099672 | A1 * | 5/2004 | Perlman | B65D 1/0223 220/631 |
| 2005/0247739 | A1 | 11/2005 | Grant | |
| 2006/0065619 | A1 | 3/2006 | Warren | |
| 2007/0045223 | A1 * | 3/2007 | Noll | B65D 1/0223 215/384 |
| 2007/0251465 | A1 * | 11/2007 | Shafer | A01K 5/0114 119/497 |
| 2016/0368675 | A1 * | 12/2016 | Fleischhacker | B01L 3/0282 |

FOREIGN PATENT DOCUMENTS

| | | |
|---|---|---|
| DE | 19831753 A1 | 1/2000 |
| DE | 19842464 A1 | 3/2000 |
| DE | 19917629 A1 | 11/2000 |
| DE | 69624069 T2 | 8/2003 |
| DE | 202005001563 U1 | 3/2005 |
| DE | 102013004821 A1 | 9/2014 |
| EP | 0157673 A1 | 10/1985 |
| EP | 0322259 A1 | 6/1989 |
| EP | 1033314 A1 | 9/2000 |
| FR | 2985503 A1 | 7/2013 |
| GB | 887893 A | 1/1962 |
| WO | WO-94/24011 A1 | 10/1994 |
| WO | WO-2014044306 A1 | 3/2014 |
| WO | WO-2015073794 A1 | 5/2015 |

\* cited by examiner

CONTAINER FOR LIQUID DETERGENT AND METHOD FOR THE METERED DISPENSING OF DETERGENT FROM THE CONTAINER

BACKGROUND

The invention relates to a container for liquid washing agent, including a main container body for receiving the washing agent and an opening for dispensing the washing agent.

In known containers for washing agents having a capacity of several liters, a distinction can be drawn between canisters that have a dispensing valve and containers having a pouring opening.

Canisters are generally very expensive and are usually only worthwhile in the case of large vessels. However, when put into operation by potential users, said canisters require a lot of space, and this makes them less attractive to users.

Containers having pouring openings generally have a standing base, which is arranged opposite the pouring opening. In order to be filled, the containers stand on the standing base and are filled from the top via said pouring opening.

DETAILED DESCRIPTION

In order to dispense washing agent from the container, the user has to lift and tip the container that is standing on the standing base. The user normally uses a handle to lift the container, which is attached to the side of the main container body in most cases. In this situation, it is difficult for the user to dispense the washing agent in a controlled manner, since on one hand they have to exert enough force to lift and tip the container, and on the other hand the tipping movement of the container has to be precise enough for the washing agent to reach the desired location in a metered manner without spilling.

The problem addressed by the invention is therefore to provide a container for liquid washing agent that has a large capacity and can be handled easily when being filled and when dispensing the liquid washing agent.

Among other examples, the present specification describes: a main container body for receiving the washing agent and an opening for dispensing the washing agent, the container includes a first standing base and a second standing base. The first standing base is arranged opposite the opening and defines a filling position of the container. The second standing base is arranged beside the first standing base and defines a storage position of the container. Furthermore, the container according to the invention includes a grip region that extends towards the opening from a side of the first standing base remote from the second standing base. In addition, a rolling surface is provided which is arranged opposite the grip region and extends substantially from the second standing base as far as the opening. Here, the grip region includes a portion which is arranged above the second standing base when the container is standing on the second standing base in the storage position.

The rolling surface, which extends towards the opening from the second standing base, acts as the surface of the container that contacts the surface below when the container is tipped out of the storage position in order to dispense washing agent through the opening in the container. It is therefore possible for the weight of the container and its contents not to have to be supported by the user when the washing agent is being dispensed, and this accordingly makes it easier to handle said container. The grip region arranged opposite the rolling surface allows the container to be reliably guided when dispensing the washing agent, it being possible for the user's hand that is holding the grip region while dispensing to slide along the grip region or to be positioned at various points on the grip region in order to tip the container. In particular, the user can also position or slide their hand in the portion of the grip region that is arranged above the second standing base. Depending on the position of the hand on the grip region, the user can therefore determine the leverage of their guiding hand relative to the tipping axis of the container themselves. This greatly facilitates the handling of the container. Since the rolling surface of the container rolls on the surface below when being tipped, the position of the tipping axis changes as the tipping angle changes. The tipping axis moves along the rolling surface towards the opening as the tipping angle becomes greater.

The capacity of the main container body may be two to eight liters. A preferred range for the capacity is between five and seven liters.

The first standing base may define a first standing plane and the second standing base may define a second standing plane, an angle between the first standing plane and the second standing plane being 20 to 40 degrees, preferably 30 to 40 degrees. If the container is in the filling position, i.e., it is standing on the first standing base, the container has to be tipped precisely about this angle in order to bring it into the storage position, where it is standing on the second standing base.

The first standing base and the second standing base may be directly adjacent and may form a shared edge. In one embodiment of the invention, this edge is rounded.

The second standing base may have a concave portion that corresponds to a convex portion on a side of the container opposite the second standing base. Therefore, when the container is in the storage position, another container can be stacked on top of this container. The concave portion of the second standing base not only ensures a lower stack height, but also ensures that the containers arranged above one another are more securely positioned.

In one embodiment of the invention, the rolling surface is substantially curved and has projecting elements, it being possible for a particular pivot position of the container to be assigned to each two adjacent elements. The projection elements may be ribs, lines, studs or points. If the user tips the container and rolls it on the rolling surface, the elements arranged on the rolling surface can divide the rolling movement into separate movement stages along the rolling surface, which the user can also detect haptically with their hand that is holding the grip region. Here, the spacing between adjacent elements can be determined such that, irrespective of the pivot angle of the container, the same quantity of washing agent is always dispensed when the container is pivoted from one movement stage to the next movement stage. In other words, the rolling movement along the rolling surface is divided into perceptible, small grids, the transition from one grid to the next corresponding to a certain quantity of washing agent, which then flows out of the opening.

A handle that is pivotally articulated to the container may be provided in addition to the grip region. A loop of the handle may be formed in one piece with the main container body by means of a film hinge. This makes it easier to handle the container, since the container can also be held and guided using the handle in addition to the grip region. In a preferred embodiment, the film hinge is arranged so as to be diametrically opposite the first standing base, which defines the filling position. If the container is lifted out of the filling position, the film hinge is thus above the first standing base. The container can thus be lifted in a torque-free manner, without the container tipping into another position in the process.

Advantageously, the handle is designed such that in particular the four fingers of the user's hand can be positioned side by side so that the user can close their hand around the handle, for example with a tight grip. The handle is preferably provided with molded grip portions for the fingers (of a human hand), which allow the handle to be gripped ergonomically.

The grip region may be an integral part of the main container body. Preferably, the main container body is produced in a blow-molding process. The main container body may be made of plastic, in particular polyethylene terephthalate (PET).

To form the grip region, the main container body may have a first grip indentation on one side wall and a second grip indentation on another side wall. This results in a reduced width of the main container body in the grip region, and this makes it possible for a hand to grasp the container even when the container body is wide.

The rolling surface may have a stop providing roll-away protection. This stop prevents the container from going beyond a particular tipping angle or from accidentally rolling away when the container is being tipped.

Another problem addressed by the invention, which is to provide a method for dispensing liquid washing agent from a container in a metered manner.

According to the invention, provided that it is closed, the opening is opened and is tipped or pivoted starting from the storage position of the container towards the rolling surface, and when said container is pivoted further the rolling surface is rolled on the surface below and thus remains in contact with said surface. Preferably, depending on the fill level and the pivot angle, the hand is positioned at various points on the grip region and slides along the grip region. When said container rolls on the rolling surface, the projecting elements can divide the rolling movement into small, perceptible stages, the transition from one stage to the next being associated with dispensing a certain quantity of washing agent.

The quantity of liquid washing agent per dispensing action may be approximately one percent of the capacity of the main container body. In one embodiment of the invention, 50 to 150 loads of laundry can be completed using one full container. With a capacity of six liters for example, for 100 loads of laundry the quantity per load is 6 centiliters (cl).

The invention is described in greater detail on the basis of the examples shown in the drawings, in which.

Figure 1:
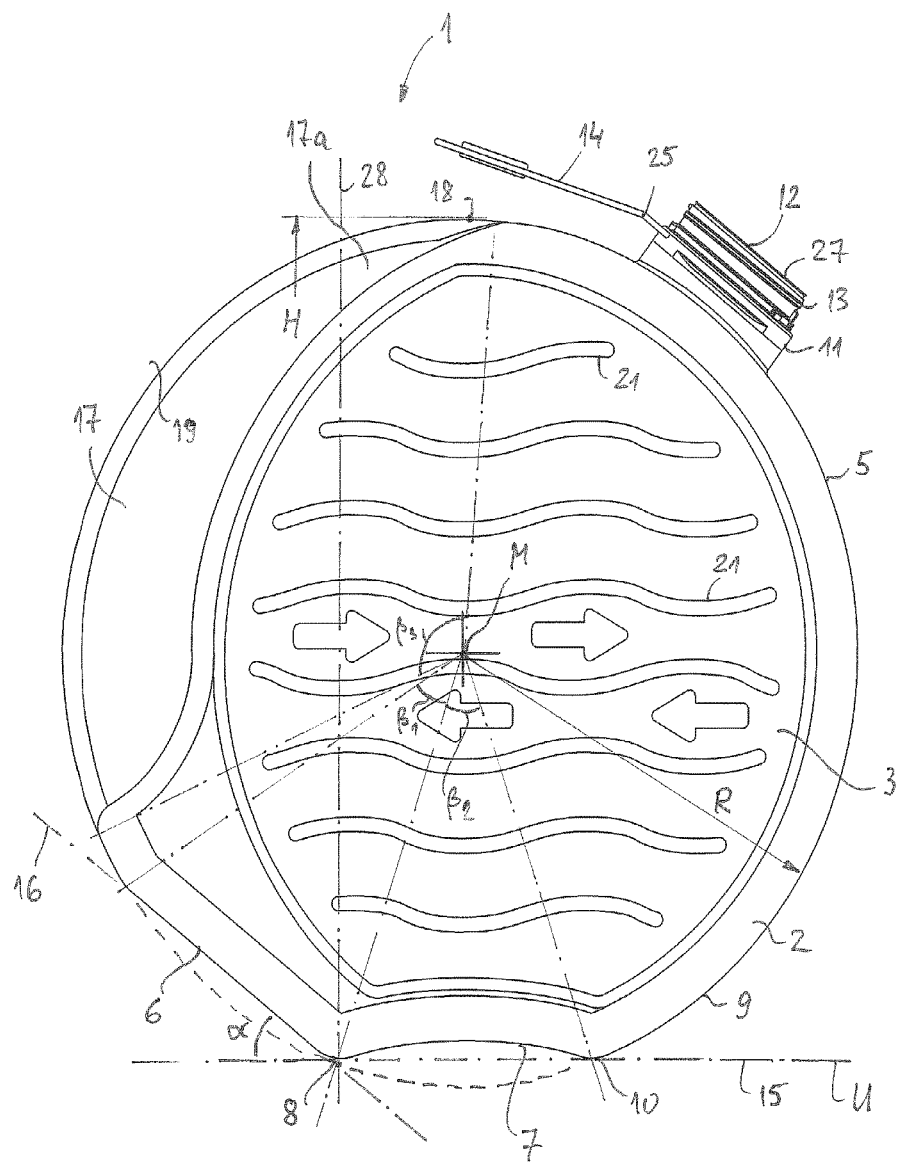
FIG. 1 is a side view of a container according to the invention.
Figure 2:
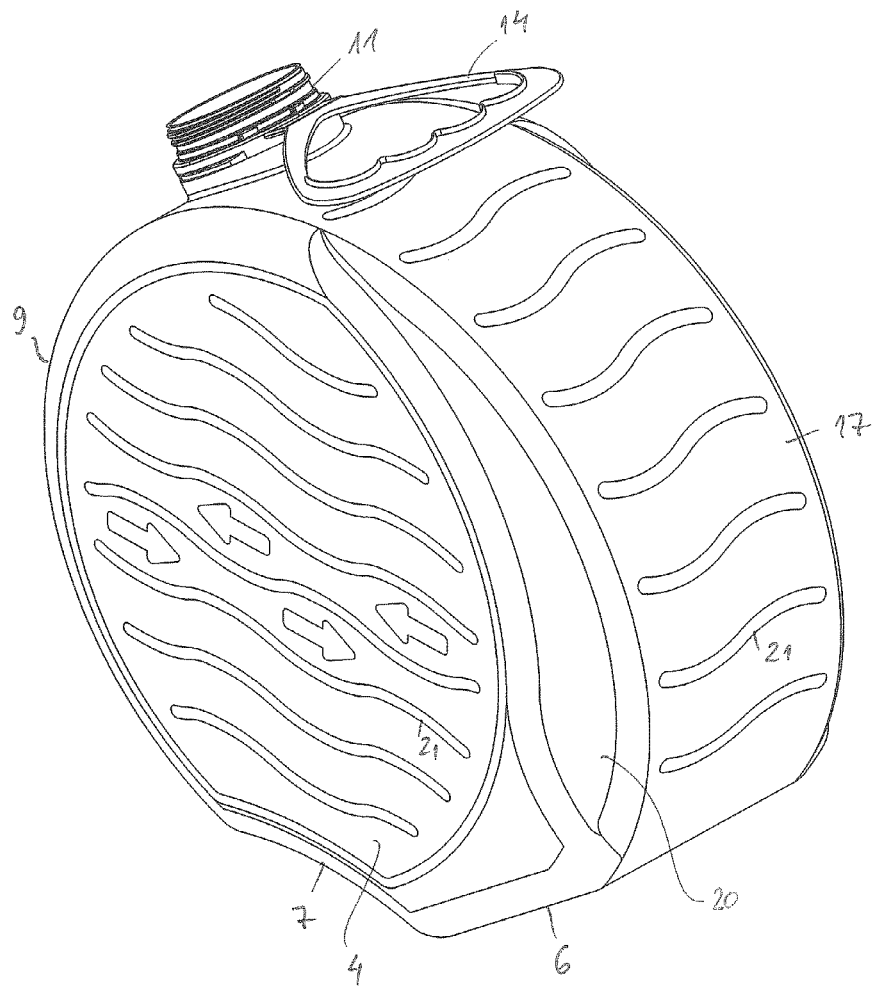
FIG. 2 is a perspective view of the container from FIG. 1.
Figure 3:
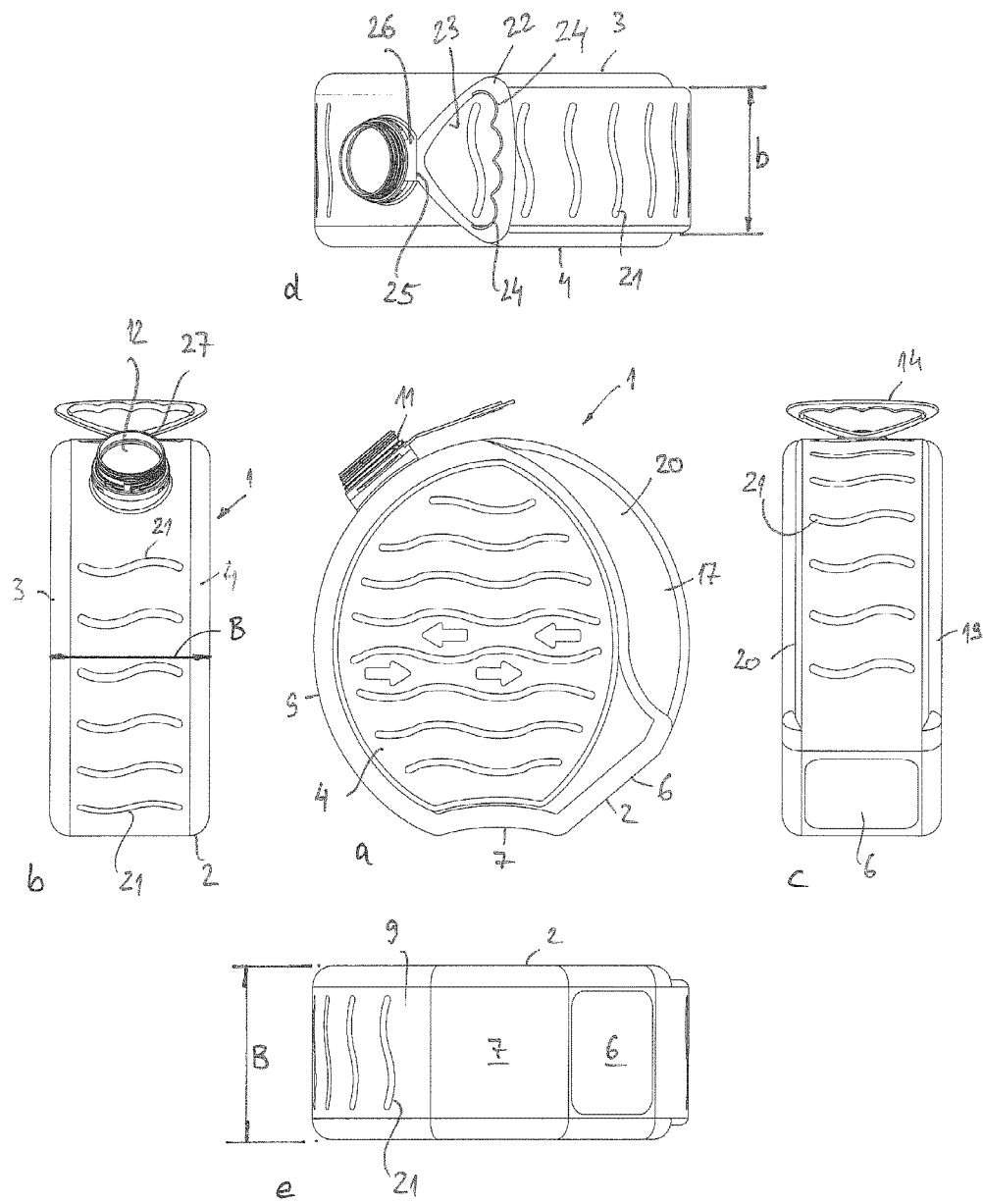
FIG. 3 shows additional views of the container from FIG. 1.

FIGS. 1 to 3 are various views of a container according to the invention, which is denoted as a whole by reference sign 1. A main container body 2 is roughly in the shape of a flat cylinder or a disc having two substantially planar end or side walls 3, 4. FIG. 1 shows one of the two side walls, namely the side wall 3. FIG. 3a, which is a side view of the other side of the container 1 according to the invention, shows the side wall 4. The distance between the parallel side walls 3, 4 defines a width B of the container 1 (see FIG. 3e, which shows the container 1 from below). The width B can also be seen in FIGS. 3b (front view) and 3c (rear view).

As can be seen in particular from FIG. 1, the side wall 3 has a substantially circular shape having a radius R. The central point of the circle having the radius R is denoted by M in FIG. 1.

The two side walls 3, 4 are connected by a circumferential lateral wall 5. In this case, the circumferential lateral wall 5 includes a plurality of portions, which are explained in greater detail in the following. The circumferential lateral wall 5 includes a first standing base 6 and a second standing base 7 adjacent thereto. The standing bases 6, 7 form a shared edge, which is denoted by reference sign 8. A rolling surface 9 adjoins the second standing base 7 on the side remote from the edge 8. The rolling surface 9 extends from an edge 10 as far as a pouring nozzle 11. The pouring nozzle 11 is arranged on the circumferential lateral wall 5 and defines an opening 12 through which the container 1 may be filled, for example, with liquid washing agent. The washing agent in the main container body can also then dispensed again through the opening 12. The pouring nozzle 11 includes an external thread 13, to which a cap (not shown here) having an internal thread can be screwed in order to close the opening 12. A handle 14 is integrally formed on the pouring nozzle 11.

The second standing base 6 extends from the edge 8 to the edge 10. Here, the connecting line between the edges 8, 10 defines a second standing plane 15. Said line coincides with the surface U below the container 1 when said container is in the position shown in FIG. 1. The position shown in FIG. 1 may serve as a storage position. As can be seen in FIG. 1, the second standing base 7 is drawn slightly inwards compared with the second standing plane 15, and therefore a concave portion is produced.

By contrast with the slightly inwardly drawn standing base 7, the first standing base 6 is designed to be flat. The first standing base 6 defines a first standing plane 16, which is at an angle α relative to the second standing plane 15. The angle α is 36 degrees.

A grip region 17 adjoins the first standing base 6 on a side remote from the edge 8 and extends approximately as far as a point 18 corresponding to the uppermost point on the main container body 2 when the container 1 is in the storage position (standing on the second standing base 7). The curvature in the region of the point 18 corresponds to the curvature of the concave portion of the second standing base 7. When two containers are arranged one above the other, this reduces the stack height and means that the upper container is more securely positioned on the lower container.

In the grip region 17, the main container body 2 includes a first grip indentation 19 (see FIG. 1) and a second grip indentation 20 (see, for example, FIG. 2 and FIG. 3a). The grip indentations 19, 20 result in a tapered lateral wall in the grip region 17, so that a human hand can grasp the main container body 2 in the grip region 17 from the outside, the thumb coming into contact with the first grip indentation 18 and the remaining four fingers on the hand coming into contact with the second grip indentation 19. A width of the lateral wall 5 in the grip region 17 is denoted by reference sign b in FIG. 3d, which shows the container from the top. The width of the lateral wall 5 in the grip regions 17 is approximately 82 percent based on the width B of the main container body 2. The grip indentations are molded such that a hand can slide along the periphery of the main container body and can be positioned at various points.

A height H of the main container body 2 is slightly less than twice the radius R. As can be seen in FIG. 1, the second standing plane 15 is slightly set back from the circumference (see the dashed line in FIG. 1) of the circle having the central point M. The same applies to the first standing plane 16. Said plane is also slightly set back from the circumference of the circle having the central point M.

The side walls 3, 4 and the circumferential lateral wall 5 include a plurality of structural reinforcements in the form of undulating recesses 21. The recesses 21 give the individual walls of the main container body 2 increased stiffness. Thereby the wall thickness of the individual walls may be reduced and the quantity of material used for the container 1 can be kept low overall.

The handle 14 includes a triangular loop 22 having rounded corners (see FIG. 3d), four molded finger portions 24 being formed on the inner edge 23 of the loop 22. The loop 22 is connected in an articulated manner using a film hinge 25 to the fastening part 26 of the handle 14, which is positioned on the pouring nozzle 11 so as to be stationary. The loop 22, the pouring nozzle 11 and the main container body 2 are formed in one piece in the example shown here.

If, in the view in FIG. 1, the container 1 is tipped anticlockwise about the edge 8, a filling position of the container 1 is reached in which the container 1 is standing on the first standing base 6. In this filling position, the pouring nozzle 11 is directed upwards. In this case, a circumferential rim 27 that defines the opening 12 is in a plane which is parallel to the first standing plane 16. In the filling position, the container 1 can be filled from the top in a simple manner. The first standing base 6 and the pouring nozzle 11 are arranged diametrically relative to one another.

In FIG. 1, a dashed-dotted line which intersects the edge 8 and extends perpendicularly to the second standing plane 15 is denoted by reference sign 28. In this figure, the dashed-dotted line or the vertical line 28 intersects the grip region 17, a portion 17a being above the second standing base 7. In the view in FIG. 1, the remainder of the grip region 17 is to the left of the vertical line 28, and is thus to the side of the second standing base 7 and no longer above the second standing base 7.

In the circumferential direction of the circle having the central point M, the second standing base 7 covers an angular range β2, the size of which corresponds to the size of an angular range β1 for the first standing base 6 (each approximately 38 degrees). A corresponding angular range β3, over which the grip region 17 extends in the circumferential direction, is around three times that of β1 or β2. Therefore, the ratio of β3 to β2 is within a preferred range of from 2 to 4.

Figure 4:
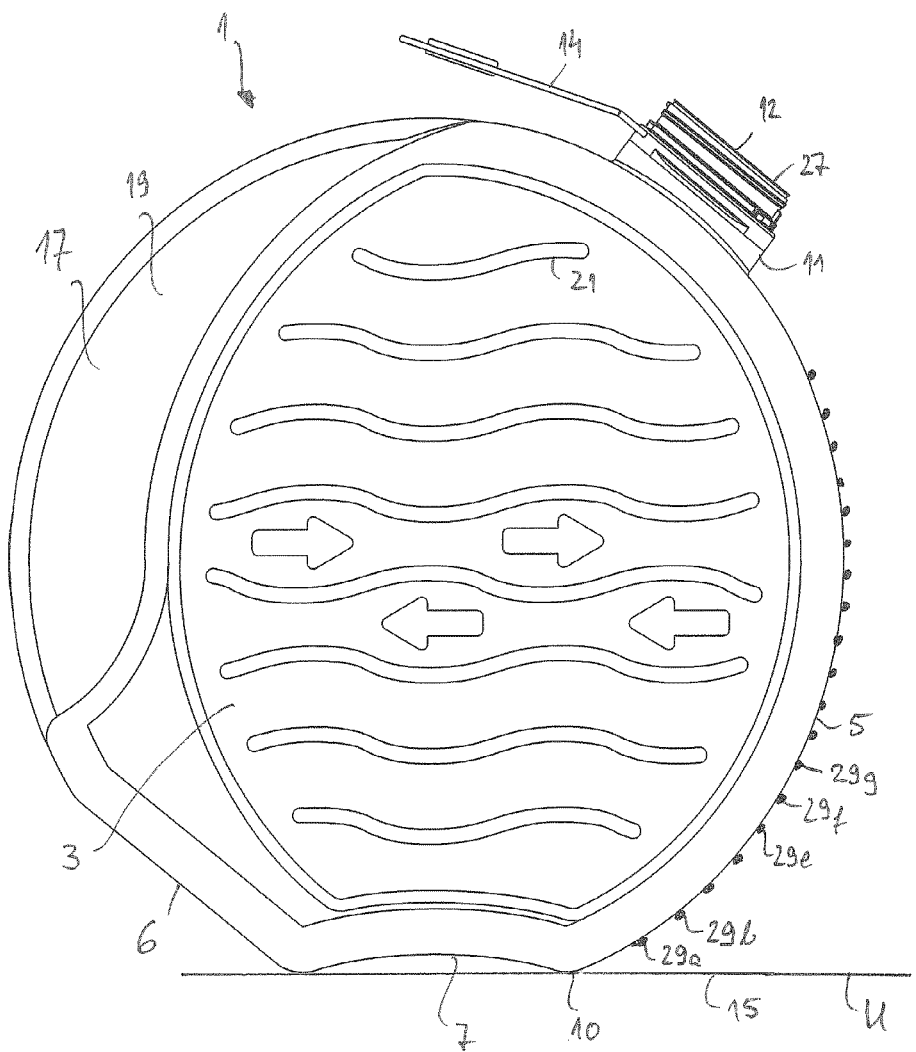
FIG. 4 is a side view of another example of the container according to the invention.

FIG. 4 is a side view of another example of a container 1 according to the invention. Components or features in FIG. 4 that are identical or similar to components and features in FIGS. 1 to 3 are provided with the same reference signs. Accordingly, reference is made to the descriptions of the drawings with regard to FIGS. 1 to 3.

Compared with the container 1 in FIGS. 1 to 3, the container 1 in FIG. 4 includes a plurality of projecting elements in the form of linear ribs 29 on the rolling surface 5. In this case, the ribs 29 extend perpendicularly to the drawing plane in the view in FIG. 4. If the container 1 is then tipped clockwise about the edge 10 starting from the storage position of the container 1 shown in FIG. 4, in order to remove liquid washing agent from container 1, the rolling surface 5 of the main container body 2 rolls on the surface U below. First of all, the rib 29a comes into contact with the surface U below. The user that is grasping the grip region 17 with their hand and carrying out the tipping movement feels when the rib 29a comes into contact with the surface below, and this is felt as a small discontinuity in the otherwise continuous rolling movement. During the rolling movement over the rolling surface 9, two adjacent ribs (for example 29e and 29f) form a stage in the rolling movement, which then transitions into the next stage when the container is tipped further. This next stage is then represented by the adjacent ribs 29f and 29g. The spacing between adjacent ribs or the spacing between adjacent stages is such that when tipping the container from one stage to the next stage, an equal quantity of liquid washing agent flows out of the opening 12 each time. Therefore, the ribs 29a, 29b, etc. act as a metering aid for the user.

In FIG. 4, the ribs and the spacing between each of them are only shown schematically. In this case, the spacing of the ribs relative to one another depends on the tipping angle of the container 1 or on the spacing of the individual ribs from the edge 10. FIG. 4 shows an example with 19 ribs. The number of ribs may be one greater than the number of doses that may be incrementally dispensed by advancing from one rib to the next rib. For example, a container for 50 doses may have 51 ribs while a container for 150 doses may have 151 ribs.

In the embodiments in the figures, the radius R may be 11 to 14 centimeters. The width B is intended to be in a range of from 9 to 12 centimeters.

List of reference signs: container 1; main container body 2; side wall 3; side wall 4; circumferential lateral wall 5; first standing base 6; second standing base 7; edge 8; rolling surface 9; edge 10; pouring nozzle 11; opening 12; external thread 13; handle 14; first standing plane 15; second standing plane 16; grip region 17; point 18; first grip indentation 19; second grip indentation 20; recess 21; loop 22; inner edge 23; molded grip portion 24; film hinge 25; stationary part 26; rim 27; dashed-dotted line/vertical line 28; and projecting element/rib 29.

What is claimed is:

1. A container for liquid washing agent, comprising:
a main container body for receiving the washing agent;
an opening for dispensing the washing agent;
a first standing base that is arranged opposite the opening and defines a filling position of the container;
a second standing base that is arranged beside the first standing base and defines a storage position of the container;
a grip region that extends towards the opening from a side of the first standing base remote from the second standing base; and
a rolling surface that is arranged opposite the grip region and extends substantially from the second standing base as far as the opening wherein the rolling surface is substantially curved and comprises a plurality of ribs positioned such that advancing the container from any rib to a next rib dispenses a fixed amount of fluid from the container,
wherein the grip region comprises a portion which is arranged above the second standing base when the container is standing on the second standing base in the storage position.

2. The container of claim 1, wherein the first standing base defines a first standing plane and the second standing base defines a second standing plane, and an angle (α) between the first standing plane and the second standing plane is 20 to 40 degrees.

3. The container of claim 1, wherein the first standing base and the second standing base are directly adjacent and form a shared edge.

4. The container of claim 1, wherein the second standing base comprises a concave portion that corresponds to a convex portion on a side of the main container body opposite the second standing base.

5. The container of claim 1, further comprising a handle that is pivotally articulated to the main container body and attached to the grip region.

6. The container of claim 1, wherein a loop of the handle is formed in one piece with the main container body by means of a film hinge.

7. The container of claim 1, wherein the grip region is an integral part of the main container body.

8. The container of claim 1, wherein the main container body has a first grip indentation on one side wall and a second grip indentation on another side wall to form the grip region.

9. The container of claim 1, wherein the rolling surface comprises a stop providing roll-away protection.

10. The container of claim 1, wherein the rolling surface comprises at least 19 ribs.

11. The container of claim 1, wherein the rolling surface comprises 51 to 151 ribs.

12. A container for dispensing metered amounts of liquid, the container comprising:
   a reservoir for holding liquid;
   an opening in the reservoir for dispensing liquid from the reservoir;
   a handle for gripping the container;
   a base on the bottom of the container to allow the container to stand unsupported;
   a rolling surface extending from the base towards the opening, the rolling surface comprising at least 19 protrusions extending across a face of the rolling surface orthogonal to a direction of rolling of the rolling surface, the protrusions parallel to each other and spaced such that advancing from any protrusion to the next, adjacent protrusion by rolling the container on the rolling surfaces dispenses a same amount of liquid from the opening.

13. The container of claim 12, wherein the rolling surface comprises at least 51 protrusions.

14. The container of claim 12, further comprising a second base allowing the container to stand in a second orientation, the second base having a concave shape.

15. A method for dispensing liquid from a container in a metered manner, comprising:
   providing a container containing liquid, the container comprising: a rolling surface comprising: a first protrusion, a second protrusion, and a third protrusion;
   wherein rolling the container from the first protrusion to the second protrusion dispenses a first fixed volume of liquid from the container and wherein rolling the container from the second protrusion to the third protrusion dispenses a second, equal fixed volume of liquid from the container.

16. The method of claim 15, wherein the rolling surface comprises at least 19 protrusions.

17. The method of claim 15, wherein the rolling surface comprises 51 to 151 protrusions.

* * * * *